June 15, 1954  J. V. DAVIS  2,681,015
WORK TRANSFER DEVICE
Filed Feb. 16, 1953  2 Sheets-Sheet 1

INVENTOR.
JOHN V. DAVIS.
BY
*Samuel Weisman*
ATTORNEY.

June 15, 1954   J. V. DAVIS   2,681,015
WORK TRANSFER DEVICE
Filed Feb. 16, 1953   2 Sheets-Sheet 2

INVENTOR.
JOHN V. DAVIS.
BY
Samuel Weisman
ATTORNEY.

Patented June 15, 1954

2,681,015

UNITED STATES PATENT OFFICE 2,681,015

WORK TRANSFER DEVICE

John V. Davis, Detroit, Mich., assignor to The Udylite Corporation, Detroit, Mich., a corporation of Delaware Application February 16, 1953, Serial No. 337,049

5 Claims. (Cl. 104—93)

1

The present invention pertains to a novel loading and unloading apparatus of the general character disclosed in the copending patent identified below. More particularly, the apparatus involves a processing machine, such as a plating installation, and a shop conveyor, with means for transferring work from the conveyor to the installation and from the installation back to the conveyor.

In the earlier patent a rail is coextensive with the shop conveyor, and means is provided for pushing the work along the rail. In the present invention, although the work is suspended from a rail in the processing machine, it is suspended from the chain of the shop conveyor to which it is transferred from the processing machine or vice versa. The principal object of the invention is to simplify the shop conveyor and to enable the use of a chain therein as the work-propelling means.

In the accomplishment of this object, a collector bar is provided between the machine and the shop conveyor. A segment of the rail in the processing machine is movable into a space or gap in the collector bar by means such as disclosed in the aforementioned patent.

In loading the processing machine, the work is first suspended from the chain through the medium of a so-called pivot carrier. The suspension includes a hook with hook elements extending in opposite directions from the shank, and one of these elements is hooked on the pivot carrier. As a given carrier, with the hook thereon, approaches an end of the collector bar, the pivot carrier is elevated by means of a cam which brings the other hook element above the collector bar. As the pivot carrier rides off the cam, the second hook element engages with the collector bar, and the pivot carrier swings away from the first hook element.

Another mechanism is provided for pushing the hook to the aforementioned segment now alined with the collector bar. The segment is next withdrawn into alinement with the rail of the processing machine, and the hook thereon is moved through the machine by suitable means.

In like manner, the movable segment is shifted from the rail into the collector bar, carrying a hook with work thereon that has been processed. This hook is now advanced from the movable segment to the remaining portion of the collector bar and is then transferred from this portion to a pivot carrier by a similar cam that elevates the carrier to latch under the double hook and take it off the collector bar.

In a broader sense the invention is a transfer mechanism for moving work from a bar or rail to a chain conveyor and vice versa.

The invention is fully disclosed by way of example in the following description and in the accompanying drawings in which.

Reference to these views will now be made by use of like characters which are employed to designate corresponding parts throughout.

Figure 1:
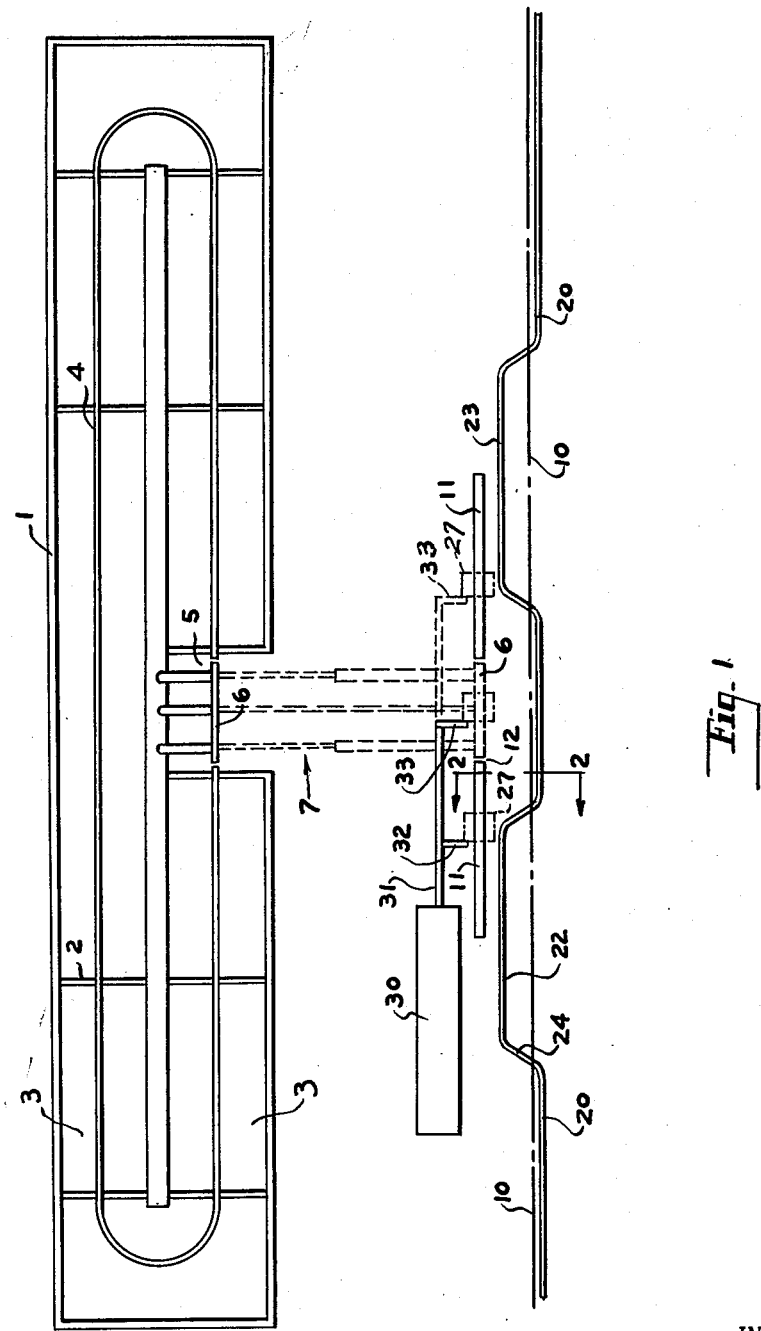
Figure 1 is a plan view of an installation.

In Figure 1 is shown an elongated plating tank 1 divided by partitions 2 into a suitable number of compartments or smaller baths 3 of designated number and length. The baths 3 are in two rows forming a circuit along a superimposed cathode or work rail 4 from which work carrier hooks are suspended. The hooks are propelled along the rail and lifted over the partitions 2 from tank to tank by means well known in the art, as shown for example in the United States Patent to J. V. Davis, No. 2,479,322, of August 16, 1949. In one lap of the circuit is formed a gap or open space 5 which contains a segment or bar 6 forming a part of the continuous rail and adapted to be shifted laterally outward of the tank system. The mechanism for shifting the bar 6 outward and inward is designated generally by the numeral 7 and is fully disclosed in the copending application of J. V. Davis, Serial No. 181,650, filed August 26, 1950, now U. S. Patent No. 2,645,186 of July 14, 1953.

Adjacent to the series of tanks is a shop track 10 running parallel to the bar 6 and extending to various locations in the shop where various operations are to be performed on the work. Parallel to the track is a collector bar 11 lying between the track member 10 of the track system and the tanks and consisting of two pieces which form a space 12 lying directly opposite and adapted to receive the bar 6 when projected out of the rail 4.

The track 10 supports a number of rolling carriages in any suitable manner. For example, if the track is an I-beam, each carriage includes two rollers 13 on each side of the beam and a channel shaped carrier 14 suspended from the four rollers. To the bottom of the carrier 14 is secured a pair of bearing blocks 15 alined lengthwise of the track and supporting an axle 16. A U-shaped yoke or pivot carrier 17 is secured to the axle 16 or otherwise mounted so that it swivels on a horizontal axis, for a purpose that will presently be described.

The track system further embodies a cam rail 20 lying below the axle 16 and extending lengthwise of the track 10, off-set laterally from the axle in the direction away from the collector bar 11. The cam has two horizontal raised portions 22 and 23 overlapping the ends of the collector bar, as shown in Figure 1. The ends of each raised portion are joined to the main cam rail 20 by inclined portions 24 extending approximately 45° both the vertical and the horizontal. The raised portions 22 and 23 lie in a vertical plane between the axle 16 and the collector bar 11.

The work that is propelled through the apparatus by the carriers 14 is suspended from a double hook associated with each carrier. Each such hook includes a shank 25 having at its upper end hook elements 26 and 27 extending in opposite directions from the shank. At the lower end of the shank is a rack 28 in which the work may be mounted, or the work piece may be suspended directly from the shank. The elements 26 and 27 are adapted for engagement respectively with the yoke 17 and the collector bar 11.

A driving chain 29 is passed through the several carriers 14 and is attached to them in order to propel the carriers and parts attached thereto, from the bearing blocks 15 to the rack 28. The chain is driven intermittently by any means known in the art, such as timed sprocket wheels for example.

Figure 2:
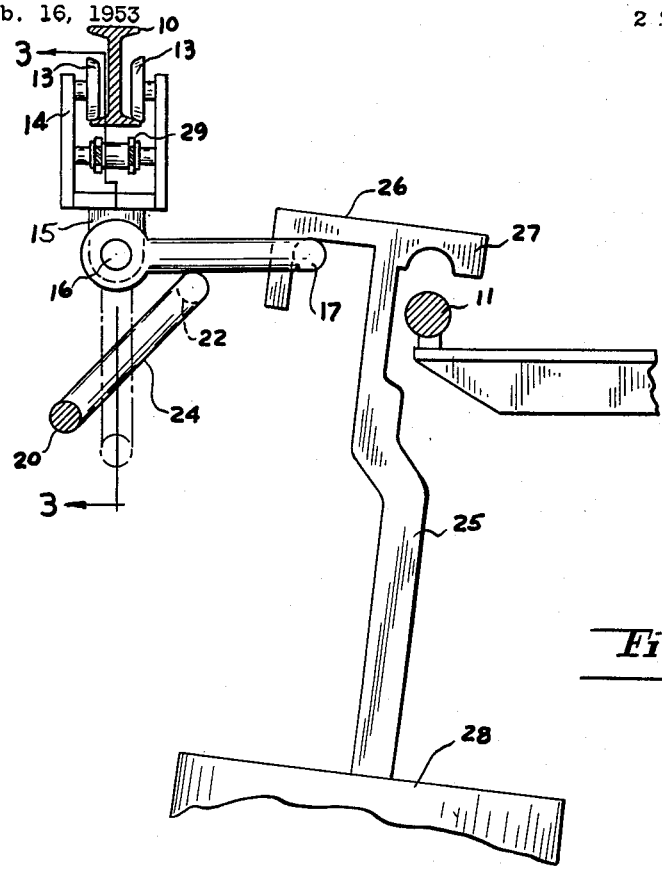
Figure 2 is a section on the line 2—2 of Figure 1.
Figure 3:
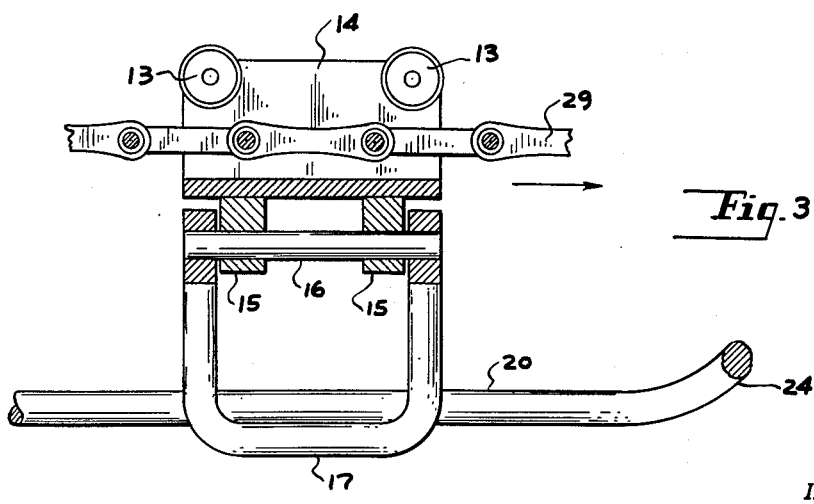
Figure 3 is a section on the line 3—3 of Figure 2.

Except when riding on the high portions 22 and 23 of the cam rail, the pivot carrier 17 hangs vertically adjacent to the cam rail 20. In this position the work carrier hook is suspended by the element 26, and the element 27 is entirely clear of the collector bar 11. Assuming that the chain 29 moves from left to right in Figure 1, the pivot carrier 17 will ride up the first incline 24 to the raised portion 22 and will there assume a horizontal position. The hook element 27 is now directly over the collector bar 11 but spaced therefrom as shown in Figure 2. As the pivot carrier 17 rides off the high portion 22, the hook element 27 engages the collector bar, and the pivot carrier disengages the hook element 26, leaving the work suspended solely from the collector bar 11.

A cylinder 30 adjacent to and parallel to the collector bar 11 has a piston rod 31 with a pair of one-way pivoted pusher fingers 32 and 33 spaced thereon and extending respectively over the first end of the bar 11, the loaded bar 6, and the other end of the bar 11. The operating of the cylinder 30 is synchronized to the movement of the loader bar 6, and when the latter is alined with the collector bar 11, the finger 32 moves the first hook 25—27 on to the loader bar 6. This bar is then drawn into the plating machine to aline with the rail 4, and the work carrier hook thereon is propelled through the plating system by means such as already mentioned. The back and forth movement of the loader bar 6 is synchronized with the movement of the chain 29 in such manner that work carrier hooks are delivered to the plating tanks at proper intervals in the manner described.

When the first work carrier hook is taken out of the plating system by the loader bar 6 and the latter alined with the collector bar 11, the finger 33 pushes the hook of the bar 6 onto the other end of the bar 11.

On the continued movement of the chain 29, a pivot carrier 27 rides up on the high portion 23 of the cam, engaging the hook element 26 and lifting the element 27 off the collector bar. The work hook carrier is now suspended solely from the pivot carrier 17. When the pivot carrier rides off the high portion 23, it hangs vertically with the work hook supported therefrom. The work hook has now passed beyond the collector bar 11, and the cam rail 20 may also be terminated here since it is no longer necessary. In the described position of the pivot carrier 17 and the work hook, the work is transported through the shop to various stations where the required operations are performed on it. If the work is finished at stations outside the plating system, new work pieces are loaded on the carrier hooks before they reach the first raised cam portion 22.

When the apparatus is fully loaded, both fingers 32 and 33 operate simultaneously on two hooks at the different stages of progress through the apparatus.

Although a specific embodiment of the invention has been illustrated and described, it will be understood that various alterations in the details of construction will be made without departing from the scope of the invention as indicated by the appended claims.

What I claim is:

1. A work transfer mechanism comprising a track system, a bar along the track of said system and spaced therefrom, a carriage movable on the track of said system, said carriage having a hook-engaging portion pivotally suspended therefrom and movable toward and away from said bar, a hook having two hook elements, one of said elements for engagement with and disengagement from said portion and the other for engagement with and disengagement from said bar, means forming part of said track system for swinging said portion adapted in one position along the track to drop said other element on said bar and in another position to remove said other element from said bar.

2. A work transfer mechanism comprising a track system, a bar along the track of said system and spaced therefrom, a carriage movable on the track of said system, said carriage having a hook-engaging portion pivotally suspended therefrom and movable toward and away from said bar, a hook having two hook elements facing in opposite directions, one of said elements for engagement with and disengagement from said portion and the other for engagement with and disengagement from said bar, means forming part of said track system for swinging said portion adapted in one position along the track to drop said other element on said bar and in another position to remove said other element from said bar.

3. A work transfer mechanism comprising a track system, a bar along the track of said system and spaced therefrom, a carriage movable on the track of said system, said carriage having a hook-engaging portion pivotally suspended therefrom and movable toward and away from said bar, a hook having two hook elements, one of said elements for engagement with and disengagement from said portion and the other for engagement with and disengagement from said bar, a cam rail aong said track and engaged by said portion, said cam rail having upper and lower level portions and intervening inclined portions, adapted in one position along the track to drop said other element on said bar and in another position to remove said other element from said bar.

4. A work transfer mechanism comprising a track system, a bar along the track of said system and spaced therefrom, a carriage movable on the track of said system, said carriage having a hook-engaging portion pivotally suspended therefrom and movable toward and away from said bar, a hook having two hook elements facing in opposite directions, one of said elements for engagement with and disengagement from said portion and the other for engagement with and disengagement from said bar, a cam rail along said track and engaged by said portion, said cam rail having upper and lower lever portions and intervening inclined portions, adapted in one position along the track to drop said other element on said bar and in another position to remove said other element from said bar.

5. A work transfer mechanism comprising a track system, a bar along the track of said system and spaced therefrom, a carriage movable on the track of said system, said carriage having a hook-engaging portion suspended therefrom and movable toward and away from said bar, a hook having two hook elements, one of said elements for engagement with and disengagement from said portion and the other for engagement with and disengagement from said bar, means forming part of said track system for swinging said portion, said bar having an intermediate segment separable therefrom, and means for moving said segment from and to said bar.

References Cited in the file of this patent

UNITED STATES PATENTS

| Number | Name | Date |
| --- | --- | --- |
| 892,543 | Newerf | July 7, 1908 |
| 2,344,155 | McBride et al. | Mar. 14, 1944 |
| 2,401,942 | LeFiell | June 11, 1946 |
| 2,407,620 | Visant | Sept. 10, 1946 |
| 2,479,322 | Davis | Aug. 16, 1949 |
| 2,525,327 | Weber | Oct. 10, 1950 |
| 2,555,072 | Zaenkert | May 29, 1951 |
| 2,645,136 | Davis | July 14, 1953 |